(12) United States Patent
Castan et al.

(10) Patent No.: US 8,579,579 B2
(45) Date of Patent: Nov. 12, 2013

(54) SEALED SHAFT ASSEMBLY FOR EXHAUST TURBINES

(75) Inventors: Joel Castan, Chantraine (FR); Gerard Dieudonne, Morristown (FR); Arnaud Gerard, Epinal (FR); Lionel Toussaint, Gerardmer (FR)

(73) Assignee: Honeywell International Inc., Morristown, NJ (US)

( * ) Notice: Subject to any disclaimer, the term of this patent is extended or adjusted under 35 U.S.C. 154(b) by 1036 days.

(21) Appl. No.: 12/615,981

(22) Filed: Nov. 10, 2009

(65) Prior Publication Data

US 2011/0110767 A1  May 12, 2011

(51) Int. Cl.
*F01D 11/00* (2006.01)

(52) U.S. Cl.
USPC .......... 415/160; 415/168.2; 415/230

(58) Field of Classification Search
USPC ............ 60/602; 415/148, 150, 151, 159, 160, 415/168.1, 168.2, 229, 230; 416/93 R
See application file for complete search history.

(56) References Cited

U.S. PATENT DOCUMENTS

| | | | | | |
|---|---|---|---|---|---|
| 2,499,315 | A | * | 2/1950 | Johnson | 411/360 |
| 3,202,034 | A | * | 8/1965 | Korenchan | 411/24 |
| 4,659,295 | A | | 4/1987 | Burdette et al. | |
| 4,685,869 | A | * | 8/1987 | Sasaki | 417/407 |
| 4,770,603 | A | * | 9/1988 | Engels et al. | 415/147 |
| 4,804,316 | A | * | 2/1989 | Fleury | 417/407 |
| 5,996,348 | A | * | 12/1999 | Watkins | 60/602 |
| 6,139,261 | A | * | 10/2000 | Bishop et al. | 415/148 |
| 6,210,106 | B1 | | 4/2001 | Hawkins | |
| 6,212,889 | B1 | * | 4/2001 | Martin | 60/602 |
| 6,269,642 | B1 | | 8/2001 | Arnold et al. | |
| 6,599,087 | B2 | | 7/2003 | Arnold et al. | |
| 6,767,183 | B2 | * | 7/2004 | Schilling et al. | 415/160 |
| 6,951,450 | B1 | * | 10/2005 | Figura et al. | 417/407 |
| 6,997,658 | B2 | * | 2/2006 | Fly | 411/107 |
| 7,000,392 | B2 | * | 2/2006 | Greentree | 60/602 |
| 7,001,142 | B2 | * | 2/2006 | Knauer et al. | 415/160 |
| 7,134,836 | B2 | | 11/2006 | Scherrer | |
| 7,644,583 | B2 | * | 1/2010 | Leavesley | 60/602 |

FOREIGN PATENT DOCUMENTS

| | | |
|---|---|---|
| GB | 2401652 A | 11/2004 |
| WO | 2004063535 A1 | 7/2004 |
| WO | 2006128616 A1 | 12/2006 |

* cited by examiner

*Primary Examiner* — Edward Look
*Assistant Examiner* — Sean J Younger
(74) *Attorney, Agent, or Firm* — Brian J. Pangrle (57) ABSTRACT

An exemplary assembly includes a component of a turbocharger that includes a bore that extends between an inner, exhaust gas side of the component and an outer, ambient side of the component; a shaft that includes a pin portion and a head portion; a sleeve positioned on the pin portion of the shaft; and a bushing positioned over at least part of the sleeve and over at least part of the head portion of the shaft where the bushing seats the shaft and the sleeve in the bore. During operation of a turbocharger that includes such an assembly, the shaft, the sleeve and the bushing restrict flow of exhaust gas from the inner, exhaust gas side of the component to the outer, ambient side of the component. Various other exemplary devices, assemblies, methods, etc., are also disclosed.

20 Claims, 7 Drawing Sheets

FIG. 7

US 8,579,579 B2

SEALED SHAFT ASSEMBLY FOR EXHAUST TURBINES

TECHNICAL FIELD

Subject matter disclosed herein relates generally to turbomachinery for internal combustion engines and, in particular, to seal mechanisms for shafts.

BACKGROUND

Conventional turbochargers often include controllable features such as a variable geometry turbine or an exhaust wastegate that exist in a high temperature environment (e.g., possibly in excess of 1000 degrees Fahrenheit or 538 degrees Celsius). To control such features, a shaft is typically positioned in a bore of a housing where one end of the shaft is exposed to an environment with a high operational temperature while the other end of the shaft is exposed to an environment with a lower operational temperature. The temperature differential complicates sealing the shaft in the bore. Specifically, where one side of the shaft is exposed to exhaust gas, leakage of exhaust gas is a commonly occurring problem.

Various exemplary techniques described herein can reduce gas leakage around a control component, such as a shaft, for controlling a feature that exists at least partially in a high temperature environment.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings where.

DETAILED DESCRIPTION

Figure 1:
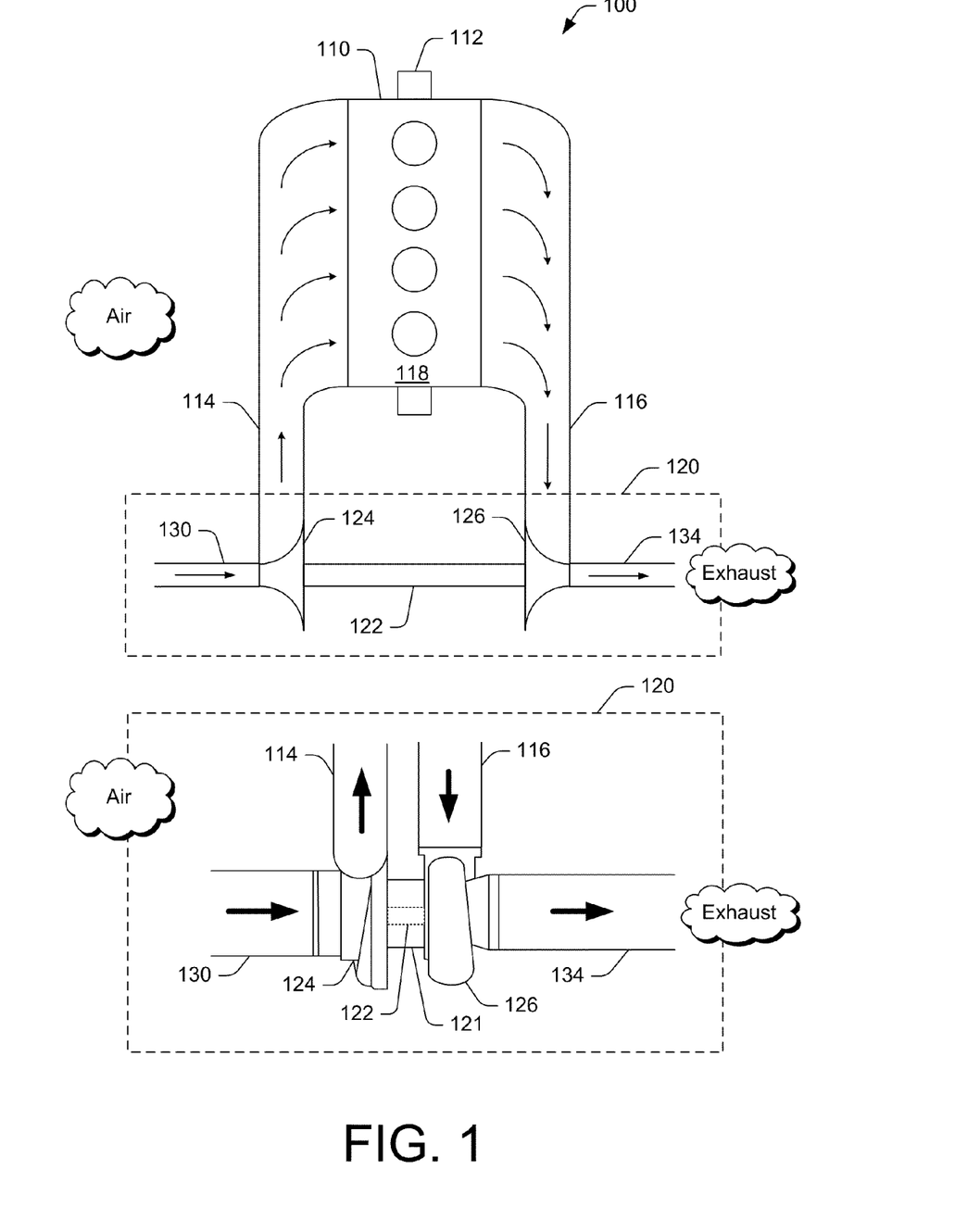
FIG. 1 is a diagram of a turbocharger and an internal combustion engine.

Turbochargers are frequently utilized to increase the power output of an internal combustion engine. Referring to FIG. 1, a power system 100 includes an internal combustion engine 110 and a turbocharger 120. The internal combustion engine 110 includes an engine block 118 housing one or more combustion chambers that operatively drive a shaft 112. An intake port 114 provides a flow path for compressed intake air to the engine block while an exhaust port 116 provides a flow path for exhaust from the engine block 118. The turbocharger 120 acts to extract energy from the exhaust and to provide energy to the intake air.

As shown in FIG. 1, the turbocharger 120 includes an air inlet 130, a shaft 122, a compressor stage 124, a turbine stage 126 and an exhaust outlet 134. Such a turbocharger may include one or more variable geometry units, which may use multiple adjustable vanes, an adjustable diffuser section, a wastegate (see, e.g., a wastegate 340 of FIG. 3) or other features to control the flow of exhaust (see, e.g., a variable geometry turbine assembly 200 of FIG. 2) or to control the flow of intake air (e.g., a variable geometry compressor). As described herein, an exemplary turbocharger may include features of a Honeywell® Turbo Technologies turbocharger (e.g., a variable geometry model such as model GTB1446VZ or other model).

In general, the turbine stage 126 includes a turbine wheel (see, e.g., a wheel 202 of FIG. 2) housed in a turbine housing (see, e.g., a turbine housing 326 of FIG. 3) and the compressor stage 124 includes a compressor wheel housed in a compressor housing where the turbine housing and compressor housing connect directly or indirectly to a center housing 121. The center housing 121 typically houses one or more bearings that rotatably support the shaft 122, which is optionally a multi-component shaft.

Figure 2:
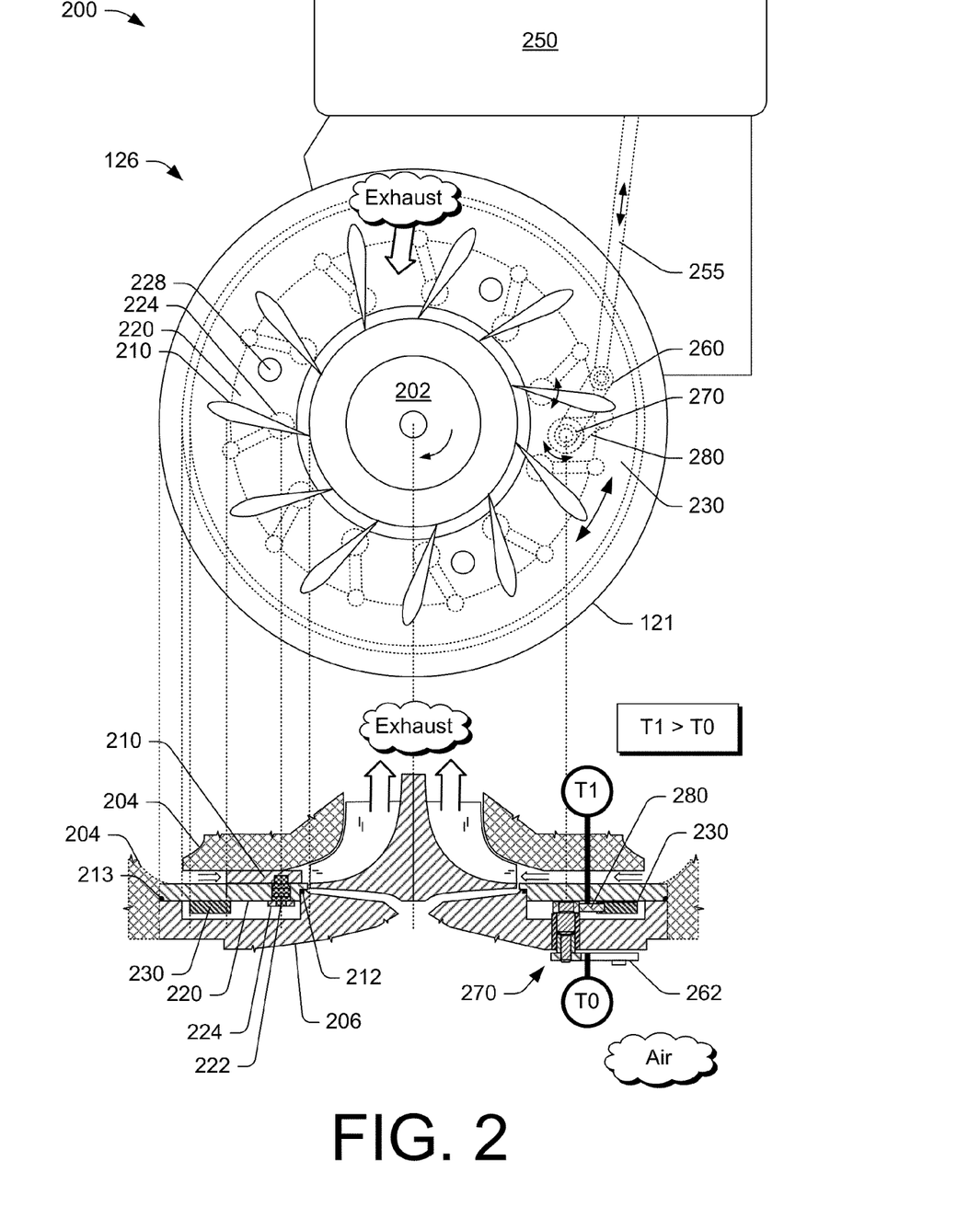
FIG. 2 is a top view and a cross-sectional views of a variable geometry turbine assembly.

FIG. 2 shows a top view of an exemplary assembly 200 that includes various turbine stage 126 components, a center housing 121, a variable geometry controller 250, which may be operably connected to an engine control unit. A cross-sectional view of various components is also shown. In the example of FIG. 2, the assembly 200 includes an exemplary sealed shaft 270. As described in more detail below, the sealed shaft 270 interconnects an outer control arm 262 with an inner crank arm 280.

In this example of a variable geometry turbine, a plurality of vanes 210 alter geometry of an annular flow section, which is defined by the turbine housing 204 and an annular nozzle ring 220. The annular arrangement of vanes 210, the turbine housing 204 and the annular nozzle ring 220 define a plurality of nozzles for passage of exhaust from a volute defined at least in part by the turbine housing 204 to the turbine wheel 202. While this example includes eleven vanes, other examples may include a different number of vanes, or as already mentioned, use a different mechanism to vary geometry of a converging flow section (e.g., converging radially toward a turbine wheel).

Each vane 210 is supported on a shaft 222, which forms a rotational axis for that vane. The shaft 222 is fixedly joined to and extends from the vane 210. The longitudinal direction of a vane's rotational axis extends between a substantially planer surface of the housing 204 and the annular nozzle ring 220. Thus, the vanes 210 are pivotable about their respective rotational axes, the shafts 222 pivoting with respect to their vanes, and the axes of rotation being generally parallel to the axis of rotation of the turbine wheel 202.

The vanes 210 are shown as having an elongated teardrop or wedge shape. The leading edge of the vanes 210 are directed upstream, against the flow of exhaust in the annular flow section. The trailing edge of each vane 210 is downstream and the shaft 222 disposed between the leading and trailing edges. The specifics of vanes 222 are for example only as vanes having other suitable shapes may be used.

Each vane 210 is connected by its shaft 222 to a vane arm 224. The connection of the shaft 222 to its vane arm 224 is fixed (e.g., welded, orbital riveting, etc.) so that the vane 210, its shaft 222, its vane arm 224 move together as a unit. Each vane arm 224 includes an enlarged inner end defining an eye for receiving the shaft 222 whereby the arm 224 is connected to a medial portion of the vane 210. Each vane arm 224 includes a vane arm shaft that connects the inner end of the vane arm to its round outer end knob.

A unison ring 230 includes a plurality of sockets where each socket receives an outer end knob of a vane arm 224. The sockets allow for some movement (e.g., rotation) of the outer end knobs but also secure the outer end knobs to some extent.

With respect to cooperation between various components of the assembly 200, in this example, the nozzle ring 220 mounts between the turbine housing 204 and the center housing 121 or a component 206 of the center housing 121, which may be a back plate. O-rings or other sealing components 212, 213 may be used to form seals between the nozzle ring 220 and other components (e.g., the turbine housing 204 and the back plate 206).

Adjustment of the vanes 210 occurs upon rotation of the unison ring 230 about its axis, typically coincident with the rotational axis of the turbine wheel 202. More specifically, rotation of the unison ring 230, with the vane arms 224 pivotally attached thereto by their movable engagement in the sockets, permits the rotational position of the vanes 210 to be adjusted. By adjusting the rotational position of the vanes 210, the passage area in the annular flow section is regulated. For example, the passage area decreases by moving the vanes 210 in a direction for aligning the vanes 220 with the tangential direction with respect to the turbine wheel 202; whereas, the passage area increases by moving the vanes 210 in a direction for aligning the vanes 210 with the radial direction of the turbine wheel 202. By a movement of the vanes 210, flow is altered (e.g., pressure, velocity, flow rate). Alteration of flow, in turn, can affect turbocharger performance and hence engine performance. Thus, vanes 210 can be adjusted to optimize engine performance.

With respect to control of a variable geometry turbine, in the example of FIG. 2, the vanes 210 are controlled by a crank mechanism operably connected to the unison ring 230. The crank mechanism includes a control rod 255 operably connected to a control unit 250, a control arm 260 operably connected to an interconnecting sealed shaft 270 and a crank arm 280 operably connected to the sealed shaft 270. The crank arm 280 is operably connected to the unison ring 230. In the example of FIG. 2, the control arm 260 translates to cause movement of the sealed shaft 270, which causes movement of the crank arm 280, which, in turn, causes rotation of the unison ring 230 and vanes 210.

The controller 250 for controlling the variable geometry turbine components of FIG. 2 may include a processor and memory where the memory stores information for use in control, to enable control, to enhance diagnostics (e.g., black box), etc. In the example of FIG. 2, the controller 250 includes an actuator (e.g., a vacuum actuator, electronic actuator, a hydraulic actuator, etc.) to move the control rod 255 where movement of the control rod 255 causes the geometry of the annular flow section to vary (e.g., by movement of the vanes 210). The controller 250 optionally includes a position sensor to facilitate control or to ascertain vane position. For example, where vane position is not readily inferred from the actuator, then a position sensor may be used to sense position of a control component (e.g., control rod 255, control arm 260, sealed shaft 270, crank arm 280, unison ring 230, vane 210, etc.) to thereby determine vane position.

In the cross-sectional view of FIG. 2, the sealed shaft 270 is shown as extending between two environments where one environment has a higher operational temperature than the other environment (i.e., T1>T0). Thus, during operation of the arrangement of FIG. 2, the sealed shaft 270 is exposed to a temperature gradient. As described herein, the higher temperature environment is referred to as an exhaust environment that may be in direct contact with exhaust gas while the lower temperature environment is referred to as an ambient or air environment that is, in general, not in direct contact with exhaust gas.

Figure 3:
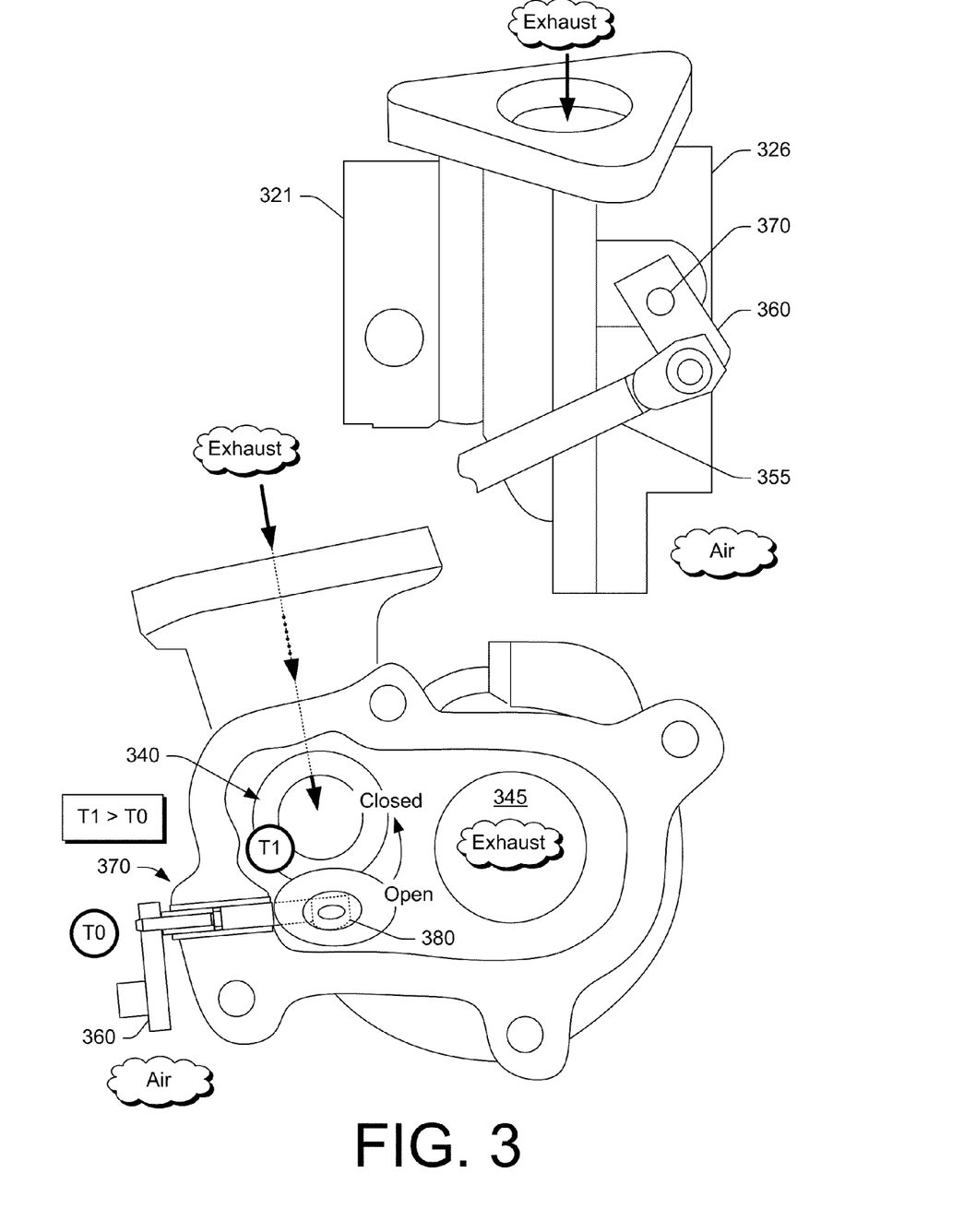
FIG. 3 is a side view and a top view of a turbine housing that includes a wastegate.

FIG. 3 shows an exemplary assembly 300 that includes a turbocharger center housing 321 and a turbine housing 326 with a wastegate 380. The wastegate 380 is operably connected to a sealed shaft 370 that is, during operation of the turbocharger, exposed to an exhaust environment with temperature T1 and an ambient or air environment with temperature T0 where T1 is greater than T0. The sealed shaft 370 is operably connected to a control arm 360 that is operably connected to a control rod 355. Actuation of the control rod 355 causes the wastegate 380 to be positioned with respect to an opening 340 that provides an exhaust gas bypass to a turbine wheel space 345.

In the examples of FIG. 2 and FIG. 3, exhaust is known to leak around a shaft disposed in a shaft bore that extends between an exhaust environment and an air environment. For a conventional sealed shaft, a one piece bushing is typically used to create a seal around a shaft positioned in a shaft bore. As shaft diameter decreases, such an approach tends to becomes less effective. A smaller shaft diameter has operational advantages, especially as to minimizing hysteresis (e.g., force required to rotate the shaft in one direction is different than force required to rotate the shaft in an opposite direction).

A particular issue for sealing small diameter shafts relates to seal rings (e.g., piston rings). Specifically, elasticity issues become more problematic as ring diameter decreases. For example, the degree of elasticity required of a piston ring material can make use of a piston ring unfeasible for production purposes. In other words, materials commonly used for construction of piston rings have elasticities that are typically suited to larger diameters. Such materials often do not provide adequate elasticity for piston rings having small diameters.

Figure 4:
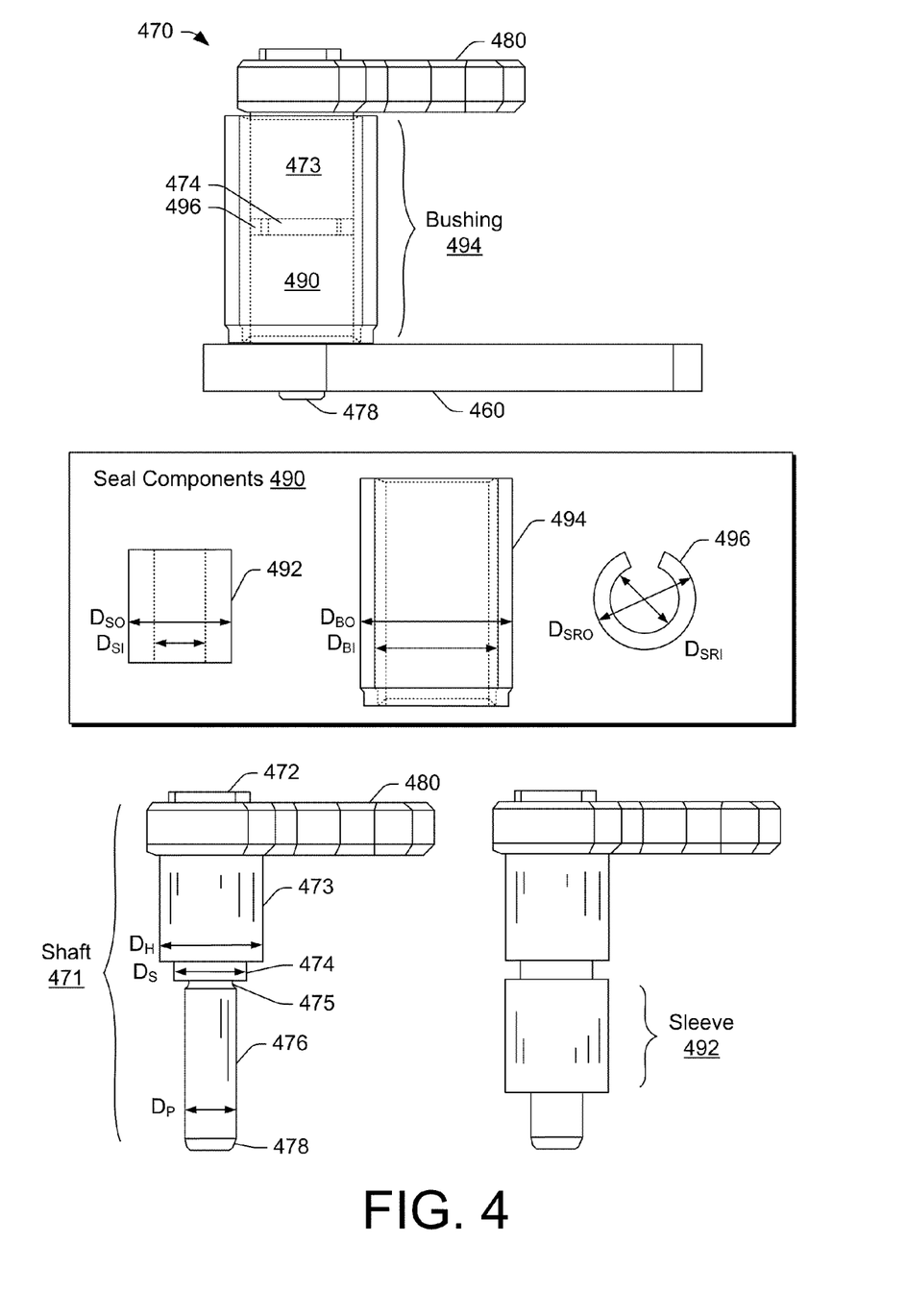
FIG. 4 is a series of views of an exemplary sealed shaft assembly.

FIG. 4 shows an exemplary sealed shaft assembly 470. The assembly 470 includes a shaft 471 fitted with seal components 490, which include a sleeve 492, a bushing 494 and optionally a seal ring 496. The shaft 471 is connected to a control arm 460 and connected (e.g., optionally integral with) a crank arm 480.

In the example of FIG. 4, the shaft 471 includes opposing ends 472, 478 and disposed between the ends 472, 478, a head portion 473, a seal ring seat portion 474, a transition portion 475 and a pin portion 476. The head portion 473 has an outer diameter ($D_H$) that is larger than an outer diameter of the pin portion 476 ($D_P$) while an outer diameter of the seal ring seat portion ($D_S$) is less than that of the head portion 473 and greater than that of the pin portion 476 (i.e., $D_H > D_S > D_P$).

The seal components 490 are shown along with various dimensions. The sleeve 492 includes an outer diameter $D_{SO}$ and an inner diameter $D_{SI}$, the bushing 494 includes an outer diameter $D_{BO}$ and an inner diameter $D_{BI}$ and the seal ring 496 includes an outer diameter $D_{SRO}$ and an inner diameter $D_{SRI}$.

In the assembly 470, the inner diameter of the sleeve 492 $D_{SI}$ is appropriately matched to the outer diameter of the pin $D_P$; the inner diameter of the seal ring 496 $D_{SRI}$ is appropriately matched to the outer diameter of the seat portion 474 DS; and the inner diameter of the bushing 494 $D_B$ is appropriately matched to the outer diameter of the head portion 473 $D_H$, the outer diameter of the seal ring 496 $D_{SRO}$ and the outer diameter of the sleeve 492 $D_{SO}$. Further, the outer diameter of the bushing 494 $D_{BO}$ is appropriately matched to the inner diameter of a bore. As described herein, an appropriate match accounts for clearances, which may further account for temperature variations and material properties (e.g., elasticity, creep, etc.).

Figure 5:
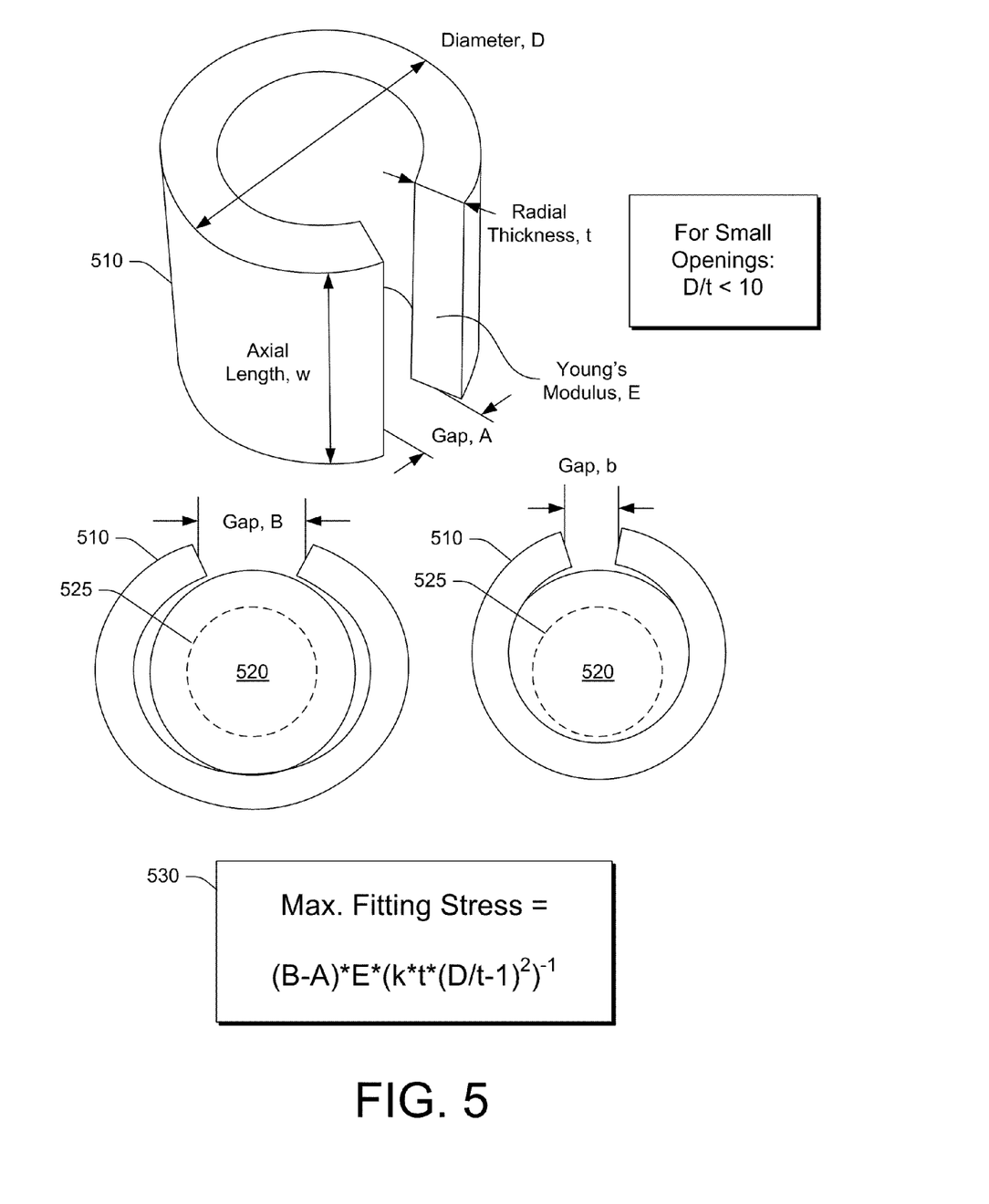
FIG. 5 is a series of diagrams of a bushing along with stress parameters and a stress equation.

FIG. 5 shows an exemplary bushing 510 that includes a free standing gap "A". The bushing 510 has an axial length "w", a radial thickness "t", an outer free standing diameter "D" and a Young's Modulus "E". When placed around a cylinder 520, the bushing 510 is deformed from its free standing shape. The gap created upon fitting is noted as "B", which is larger than the free standing gap "A". This causes so-called "fitting stress". The fitting stress may be approximated by an equation 530 that depends on the difference between the free standing gap "A" and "stretched" gap "B" as well as the radial thickness "t", the free standing outer diameter "D", the Young's Modulus "E" for the material of construction (e.g., as treated) and a constant "k".

Fitting stress can damage a piston ring, especially when the D/t ratio becomes small. Note that the ratio "D/t" appears in the denominator of the equation and it is squared. Thus, as D/t decreases (e.g., as typical for small piston rings), the maximum fitting stress increases. For example, for a conventional variable geometry turbine assembly, a seal ring may have a diameter "D" of about 6 mm and a radial thickness "t" of about 0.8 mm to about 1 mm. In such an example, the D/t ratio is about 6 and the maximum fitting stress significant.

To overcome such issues, an exemplary sealed shaft assembly implements a multi-component approach that relies on a sleeve and a bushing. Referring again to the assembly 470 of FIG. 4, the sleeve 492 is positioned on the pin portion 476 of the shaft 471 and then the bushing 494 is fit over the sleeve 492. The sleeve 492 may be a continuous cylinder or it may have a gap (see, e.g., the bushing 510 of FIG. 5). As the bushing 494 fits around the wide head portion 473 of the shaft 471, it maintains a large diameter, relative to the components of the assembly 470. Further, as it has an axial length that extends over a significant length of the shaft 471, it has "more material" to absorb any fitting stress and remain effective for sealing the shaft 471 in a bore (e.g., allowing for larger components in a small OD frame and optionally a wider selection of materials of construction).

As described herein, an exemplary sealed shaft assembly may optionally use a material or materials of construction other than those relied on for automotive piston rings (e.g., other than a conventional steel piston ring material). An exemplary material of construction may have a Young's Modulus less than that of a conventional seal ring used to seal a shaft that is exposed to two different environments (e.g., an exhaust environment and an air environment).

An exemplary method includes providing a shaft, optionally placing a seal ring on the shaft, placing a sleeve over a pin portion of the shaft, attaching the shaft to an arm, placing a bushing over at least a portion of the sleeve to form an sealed shaft assembly, inserting the sealed shaft assembly in a bore via an end of the bore, and attaching another arm to the shaft at an opposing end of the bore. In such a method, the attaching the shaft to an arm may occur before or after the placing of the bushing.

As described herein, a bushing may contact one arm or two arms. An axial dimension may be defined by a surface of one arm and a surface of another arm where a bushing has an axial length approximately matched to that axial dimension. Such matching may account for thermal expansion of one or more components. For example, a bushing may have a thermal conductivity and a thermal expansion that can be determined a priori for a maximum temperature. Similar determinations may be made for a shaft and optionally a component with a target bore for placement of a sealed shaft assembly. Such calculations may be relied up to determine clearances at ambient conditions. Yet further, a sleeve may be designed or selected from a material of construction having properties that ensure adequate sealing during operation of a turbocharger (e.g., noting that a sleeve may be selected for a particular axial expansion or minimal axial expansion). Similarly, a seal ring, if used as part of a sealed shaft assembly, may be designed or selected from a material of construction having properties that ensure adequate sealing during operation of a turbocharger.

Figure 6:
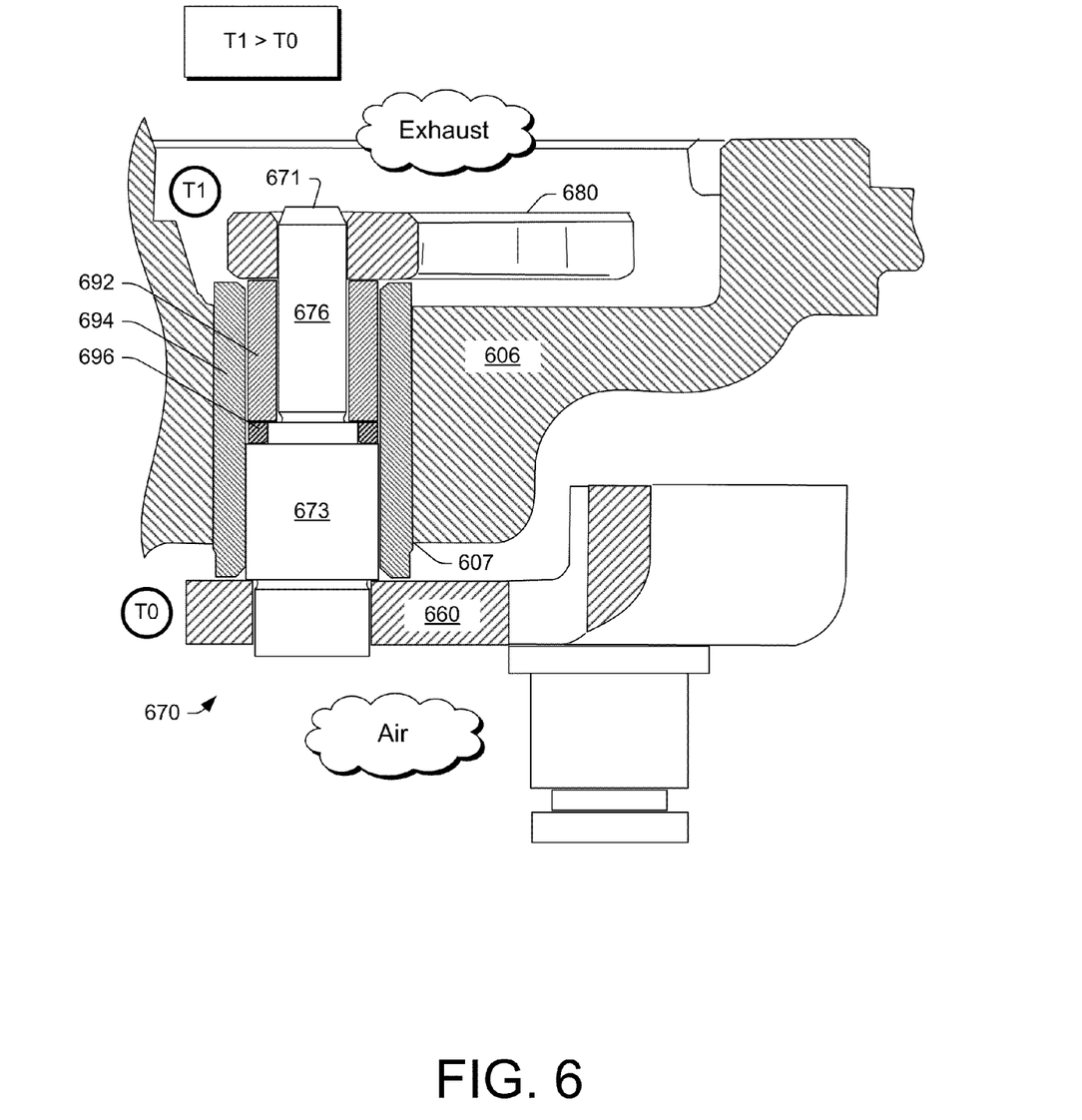
FIG. 6 is a cross-sectional view of an exemplary assembly.

FIG. 6 shows an exemplary sealed shaft assembly 670 as positioned in a bore 607 of a component 606. The sealed shaft assembly 670 includes a shaft 671, a sleeve 692, a bushing 694 and an optional seal ring 696. A control arm 660 is attached to the shaft 671 near one end of the bore 607 while a crank arm 680 is attached to the shaft near an opposing end of the bore 607.

In this example, a pin portion 676 of the shaft 671 is exposed to the exhaust environment. Such an approach reduces the amount of surface area of the shaft 671 in direct contact with the exhaust environment. Further, such an approach places more surface area of the shaft 671 in direct contact with the air environment. Accordingly, heat transfer to the shaft 671 from exhaust gas may be reduced while heat transfer away from the shaft 671 to air may be increased.

Figure 7:
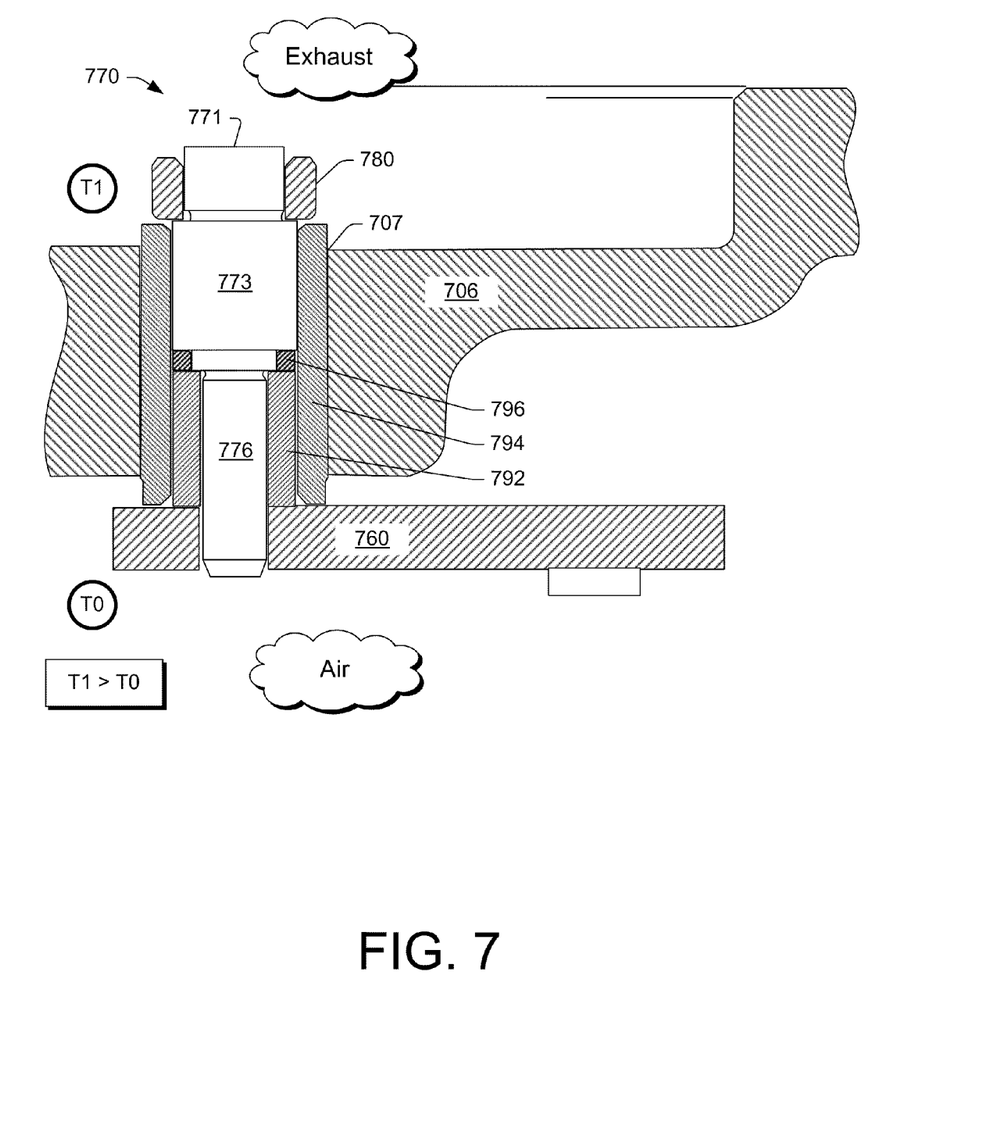
FIG. 7 is a cross-sectional view of an exemplary assembly.

FIG. 7 shows an exemplary sealed shaft assembly 770 as positioned in a bore 707 of a component 706. The sealed shaft assembly 770 includes a shaft 771, a sleeve 792, a bushing 794 and an optional seal ring 796. A control arm 760 is attached to the shaft 771 near one end of a bore 707 while a crank arm 780 is attached to the shaft at an opposing end of the bore 707. In this example, the axial length of the shaft 771 exceeds the axial length of the bushing 796, which exceeds the axial length of the sleeve 794. In the example of FIG. 7, the seal ring 794 is seated on the shaft 771 and an axial end of the sleeve 792 is seated against the seal ring 794. Some clearance may exist, especially at ambient conditions, between the shaft 771, the seal ring 794 and the sleeve 792. Further, some clearance may exist, especially at ambient conditions, between the bushing 796 and the seal ring 794, between the bushing 796 and the sleeve 792 or between the bushing 796 and the seal ring 794 and the sleeve 792. During operating, exhaust gas and other heat sources (e.g., friction) increase temperature and cause various components of the sealed shaft assembly 770 to expand. In an expanded state, the exemplary assembly 770 aims to allow for rotation of the shaft 771 (e.g., to move the crank arm 780) while minimizing exhaust leakage via the bore 707 and while minimizing hysteresis. In essence, the amount of force required to rotate the shaft 771 in one direction should be approximately equal to the amount of force required to rotate the shaft 771 in an opposite direction. With respect to minimization of hysteresis, part of this response may be due to reducing the diameter of the bore 707 compared to conventional bores for control of exhaust gas side components associated with a turbocharger (e.g., variable geometry, wastegate, etc.).

As described herein, an exemplary assembly includes a component of a turbine (e.g., for a turbocharger) that includes a bore that extends between an inner, exhaust gas side of the component and an outer, ambient side of the component; a shaft that includes a pin portion and a head portion; a sleeve positioned on the pin portion of the shaft; and a bushing positioned over at least part of the sleeve and over at least part of the head portion of the shaft where the bushing seats the shaft and the sleeve in the bore. As described herein, during operation of a turbocharger, the shaft, the sleeve and the bushing restrict flow of exhaust gas from the inner, exhaust gas side of the component to the outer, ambient side of the component.

An exemplary sealed shaft assembly may optionally include a ring disposed between a head portion of a shaft and a sleeve. Such a ring may include a gap. As described herein, one or more components may include a gap. For example, a bushing may include a gap, a sleeve may include a gap, etc.

As described with respect to the example of FIG. 6, in an exemplary assembly, an axis of a shaft, from a pin portion to a head portion, may be aligned in a direction from an inner, exhaust gas side of a component to an outer, ambient side of the component. Such an alignment may act to reduce transfer of heat transfer to the pin portion. Alternatively, for example, as shown in FIG. 7, an axis of a shaft, from a pin portion to a head portion, may be aligned in a direction from an outer, ambient side of a component to an inner, exhaust gas side of the component. As described herein, a shaft may optionally have a diameter less than about 10 mm.

As described herein, an exemplary base for a variable geometry turbine includes a bore that extends between an exhaust gas side of the component and an ambient side of the base; a shaft configured to control the geometry of the variable geometry turbine where the shaft includes a pin portion and a head portion; a sleeve positioned on the pin portion of the shaft; and a bushing positioned over at least part of the sleeve and over at least part of the head portion of the shaft where the bushing seats the shaft and the sleeve in the bore. During operation of a turbocharger that includes the assembly, the shaft, the sleeve and the bushing act to restrict flow of exhaust gas via the bore. Such an assembly may include a crank arm attached to an exhaust gas side of the shaft, a control arm attached to an ambient side of the shaft, or both. Such an assembly may further include a ring disposed between the head portion of the shaft and the sleeve.

As described herein, an exemplary method can include providing a base for a variable geometry turbine that includes a bore that extends between an exhaust gas side of the component and an ambient side of the base; placing a sleeve on a pin portion of a shaft; placing a bushing over the sleeve and a head portion of the shaft; inserting the bushing, the sleeve and the shaft in the bore; attaching a crank arm to the shaft; and attaching a control arm to the shaft (e.g., to move the control arm to rotate the shaft and thereby move the crank arm). Such a method may further include placing a ring on the shaft prior to placing the sleeve on the pin portion of the shaft.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

The invention claimed is:

1. An assembly comprising:
a component of a turbocharger that comprises a bore that extends between an inner, exhaust gas side of the component and an outer, ambient side of the component;
a shaft that comprises a pin portion and a head portion;
a sleeve positioned on the pin portion of the shaft; and
a bushing positioned over at least part of the sleeve and over at least part of the head portion of the shaft,
wherein the bushing seats the shaft and the sleeve in the bore and
wherein during operation, the shaft, the sleeve and the bushing restrict flow of exhaust gas from the inner, exhaust gas side of the component to the outer, ambient side of the component.

2. The assembly of claim 1 further comprising a ring disposed between the head portion of the shaft and the sleeve.

3. The assembly of claim 2 wherein the ring comprises a gap.

4. The assembly of claim 1 wherein the bushing comprises a gap.

5. The assembly of claim 1 wherein the sleeve comprises a gap.

6. The assembly of claim 1 further comprising a crank arm, the crank arm attached to the shaft.

7. The assembly of claim 1 further comprising a control arm, the control arm attached to the shaft.

8. The assembly of claim 1 wherein the shaft comprises a shaft configured to adjust a variable geometry turbine.

9. The assembly of claim 1 wherein the shaft comprises a shaft configured to adjust a wastegate.

10. The assembly of claim 1 wherein an axis of the shaft, from the pin portion to the head portion, is aligned in a direction from the inner, exhaust gas side of the component to the outer, ambient side of the component.

11. The assembly of claim 10 wherein the alignment of the shaft reduces transfer of heat transfer to the pin portion.

12. The assembly of claim 1 wherein an axis of the shaft, from the pin portion to the head portion, is aligned in a direction from the outer, ambient side of the component to the inner, exhaust gas side of the component.

13. The assembly of claim 1 wherein the shaft comprises a diameter less than about 10 mm.

14. A base for a variable geometry turbine comprising:
a bore that extends between an exhaust gas side of the base and an ambient side of the base;
a shaft configured to control the geometry of the variable geometry turbine wherein the shaft comprises a pin portion and a head portion;
a sleeve positioned on the pin portion of the shaft; and
a bushing positioned over at least part of the sleeve and over at least part of the head portion of the shaft wherein the bushing seats the shaft and the sleeve in the bore and wherein during operation, the shaft, the sleeve and the bushing restrict flow of exhaust gas via the bore.

15. The base of claim 14 further comprising a crank arm attached to an exhaust gas side of the shaft.

16. The base of claim 14 further comprising a control arm attached to an ambient side of the shaft.

17. The base of claim 14 further comprising a ring disposed between the head portion of the shaft and the sleeve.

18. A method comprising:
providing a base for a variable geometry turbine that comprises a bore that extends between an exhaust gas side of the base and an ambient side of the base;
placing a sleeve on a pin portion of a shaft;
placing a bushing over the sleeve and a head portion of the shaft;
inserting the bushing, the sleeve and the shaft in the bore;
attaching a crank arm to the shaft; and
attaching a control arm to the shaft.

19. The method of claim 18 further comprising placing a ring on the shaft prior to placing the sleeve on the pin portion of the shaft.

20. The method of claim 18 further comprising moving the control arm to rotate the shaft and thereby move the crank arm.

* * * * *